3,590,032
PRODUCTION OF CAPROLACTAM
Brian Walton Harris, Horley, England, assignor to BP Chemicals (U.K.) Limited, London, England
No Drawing. Filed Oct. 7, 1968, Ser. No. 765,652
Claims priority, application Great Britain, Nov. 9, 1967, 51,095/67; July 16, 1968, 33,761/68
Int. Cl. C07d 41/06
U.S. Cl. 260—239.3                    17 Claims

ABSTRACT OF THE DISCLOSURE

Caprolactam is produced by heating together 1,1'-peroxydicyclohexylamine and a lithium halide in a molten caprolactam environment.

---

The present invention relates to a process for the production of caprolactam.

According to the present invention a process for the production of caprolactam comprises heating together 1,1'-peroxydicyclohexylamine and a lithium halide in a molten caprolactam environment.

The reaction is carried out in a molten caprolactam environment, in other words caprolactam is the major component of the reaction medium into which the 1,1'-peroxydicyclohexylamine is fed. Cyclohexanone is formed as well as caprolactam, in the course of the reaction.

The 1,1'-peroxydicyclohexylamine may be fed to the reaction as a solid. Alternatively it may be fed in the molten form or as an oil containing some cyclohexanone. It is particularly convenient to feed the 1,1'-peroxydicyclohexylamine as an oil containing some cyclohexanone, referred to in this specification as "peroxyamine oil."

The preferred lithium halides are lithium chloride and lithium bromide. The lithium halide may be recovered substantially unchanged from the reaction product so that the lithium halide used may be fresh lithium halide or recycled lithium halide from the reaction product. A minor proportion of the lithium halide may react however to give various lithium compounds. Lithium chloride does not react to give lithium-containing by-products as readily as lithium bromide and is the preferred lithium halide. The lithium halide whether fresh or recycled may be fed as a solid to the reactor but it is convenient to feed it as a solution in molten caprolactam and it is particularly preferred to recycle a solution of lithium halide in caprolactam from the reaction product.

The reaction may be carried out batchwise for example by adding caprolactam and lithium halide and 1,1'-peroxydicyclohexylamine to a reactor, in which the caprolactam is maintained in the molten state. Alternatively the reaction may be carried out continuously by feeding a caprolactam stream to one or more reactors to which 1,1'-peroxydicyclohexylamine and lithium halide are also fed and from which the products are continuously removed.

The preferred method of carrying out the invention is to feed a recycle stream of lithium halide in molten caprolactam, together with a separate feed of fresh peroxyamine oil, to the reactor. By adjustment of the feed ratio, temperature, and throughput rate and by removing cyclohexanone from the reactor by disillation as it is formed, the concentrations of cyclohexanone, caprolactam, lithium halide and 1,1'-peroxydicyclohexylamine can be maintained at desired levels.

The reaction may be carried out continuously without recycle of caprolactam by feeding fresh or recycled solid lithium halide and 1,1'-peroxydicyclohexylamine to a reactor containing molten caprolactam. The feed and effluent rates may then be adjusted as indicated above.

The process of the present invention is preferably carried out at temperatures in the range 60° C. to 170° C., temperatures in the range 100° C. to 140° C. being particularly preferred.

The molar ratio of lithium halide to 1,1'-peroxydicyclohexylamine fed to the reaction may for example be in the range 0.1:1 to 5:1, molar ratios above 0.3:1 being preferred.

Where a caprolactam stream is fed to the reaction at the same time as the 1,1'-peroxydicyclohexylamine, the molar ratio of caprolactam fed to 1,1'-peroxydicyclohexylamine fed to the reaction may vary over a moderately wide range for example up to 8:1, the range 0.5:1 to 5:1 being particularly preferred.

It is highly desirable for the concentration of lithium halide in the reaction mixture to be greater than 0.01 mole per litre, and the concentration preferably greater than 0.5 mole per litre. When the reaction is carried out continuously, with the lithium halide recycled as a solution in caprolactam, the concentration of lithium halide in the reaction mixture is generally determined by the quantity of caprolactam to be recycled and the solubility of the lithium halide in this recycled material, as it is not convenient to recycle the lithium halide as a slurry in caprolactam. The concentration of the lithium halide in the reaction product will be less than the concentration in the recycle caprolactam because of the presence of the 1,1'-peroxydicyclohexylamine and the cyclohexanone and caprolactam formed from it.

The reaction may be conveniently carried out over a moderately wide range of pressure including atmospheric pressure and subatmospheric pressure.

The reactor used for the process of the present invention may be any convenient type for example a coiled pipe reactor or a stirred tank reactor. When a stirred tank reactor is used it is preferred to use at least two in series or a stirred tank followed by a pipe reactor to ensure the maximum conversion of the 1,1'-peroxydicyclohexylamine.

The reaction of the 1,1'-peroxydicyclohexylamine is strongly exothermic and efficient cooling, for example by the use of cooling coils or other heat exchange means such as adjusting the pressure so that the reaction mixture boils at the desired reaction temperature and the heat of reaction is removed as latent heat of vaporisation, is desirable to control the reaction temperature. Efficient mixing of the constituents of the reaction mixture, e.g. by stirring the reactor, is also desirable.

The caprolactam formed in the reaction may be recovered by any convenient method.

Caprolactam may be distilled off after cyclohexanone has been recovered from the reaction mixture. Alternatively cyclohexanone and caprolactam may be co-distilled. In continuous operation it is generally more convenient to separate as product only part of the caprolactam (e.g. by distillation) from the total reaction product, and to recycle the remainder of the reaction product consisting mainly of caprolactam and lithium halide to the reaction.

In the case when the reaction product containing lithium halide, less any caprolactam taken off as product, is recycled to the reaction any high boiling by-products will tend to build up in the reaction mixture. It may therefore be desirable to take a purge stream from the reaction mixture, or from the reaction product which is being recycled. Where the reaction product is being recycled it may be preferred however to subject it to a purification step to separate high boilers from caprolactam before it is fed to the reaction.

The invention will now be illustrated by the following examples in which all parts are parts by weight, all temperatures are in Celsius degrees and all pressures are in millimetres of mercury unless otherwise indicated.

EXAMPLE 1

Caprolactam containing dissolved lithium chloride and 1,1'-peroxydicyclohexylamine containing some cyclohexanone were fed to a 280 ml. continuous stirred reactor and the product was allowed to overflow through a 80 ml. glass coil reactor under plug-flow conditions.

Using a feed molar ratio LiCl:peroxyamine-caprolactam:cyclohexanone of 1:1:2:0.15 and contact times of 3.5 hours in the stirred reactor, 1.0 hour in the plug flow reactor, both reactors being at 106° C., the peroxide conversion was 98.6% (94.8+3.8).

The yields calculated as moles per 100 moles of 1,1'-peroxydicyclohexylamine fed were: caprolactam, 83; cyclohexanone, 80; n-caproamide and 5-hexenamide, 5.5; 6 - chlorocaproamide, 0.7; cyclohexenylcyclohexanone, 4.8% and high boilers, 5.5% w./w.

EXAMPLE 2

An experiment carried out as in Example 1 using a molar feed ratio of 0.7:1.0:1.4:0.2 and contact times of 2.8 hour at 107° in the stirred reactor and 0.8 hour at 105° in the coil reactor gave an overall peroxide conversion of 97.2%. Yields calculated as in Example 1 were: caprolactam, 80 :cyclohexanone, 81.

EXAMPLE 3

Two stirred reactors (800 ml.), fitted with internal coils through which cooling water could be circulated, and external heating elements, were connected in series so that effluent from the first reactor passed into the second reactor.

Lithium bromide (1 part) was dissolved in caprolactam (5 parts) at 110° C., then heated to 120° C. and pumped to the first reactor. which was maintained at 105±5° C. 1,1'-peroxydicyclohexylamine was melted at 40° C. and pumped separately to the first reactor. The molar ratios of lithium bromide to caprolactam and 1,1'-peroxydicyclohexylamine to caprolactam fed to the first reactor were 0.24.1 and 0.26.1. The effluent from the first reactor was fed to the second reactor, which was also maintained at 105±5° C., the effluent from the second reactor being the final product. The average residence time for each reactor was 1.5 hours giving a total reaction time of 3 hours.

The final product was analyzed by distillation, gas phase chromatography and chemical methods and the average results obtained while the reaction was run for a period of six hours, were as follows:

|  | Percent |
| --- | --- |
| Peroxide conversion in first reactor | 86 |
| Peroxide conversion in second reactor (based on peroxide fed to the first reactor) | 13.8 |
| Total peroxide conversion | 99.8 |

Yields of products (moles of product per 100 moles 1,1'-peroxydicyclohexylamine fed) were caprolactam 79 and cyclohexanone 99.

EXAMPLE 4

Molten 1,1'-peroxydicyclohexylamine (21.1 parts) was added over 1.5 hours to a batch reactor maintained at 110° containing initially lithium bromide (1.3 parts) and caprolactam (5.0 parts).

A further quantity of lithium bromide (1.0 part) was then added and after a total reaction time of 2.1 hours, analysis revealed that only 3.4% of the 1,1'-peroxydicyclohexylamine was unreacted. The contents of the reactor were then analyzed by extraction, distillation, gas phase caprolactam, 80: cyclohexanone, 81.

The yield of caprolactam obtained was 81.3% (moles of caprolactam per 100 moles of 1,1'-peroxydicyclohexylamine fed) and that of cyclohexanone was 92.2% (moles of cyclohexanone per 100 moles of 1,1'-peroxydicyclohexylamine fed).

EXAMPLE 5

Solid 1,1'-peroxydicyclohexylamine (10.0 parts) was added to a mixture of caprolactam (20.1 parts) and lithium bromide (4.0 parts) contained in a stirred batch reactor at 100° C. The resulting reaction mixture was maintained at 100° ±2° for three hours, after which analysis showed that the conversion of the 1,1'-peroxydicyclohexylamine to products was greater than 99.9%.

The reaction mixture was poured into water and extracted repeatedly with chloroform until the caprolactam had all been extracted. The chloroform was then distilled off and the residue distilled at 13 mm. Hg to recover cyclohexanone and at 0.1 mm. Hg to recover caprolactam. The yields of caprolactam and cyclohexanone in the distillate were 80.3 and 82.6 respectively, based on moles of product per 100 moles of 1,1'-peroxydicyclohexylamine.

The examples clearly demonstrate that it is possible to carry out the production of caprolactam from 1,1'-peroxydicyclohexylamine in a reaction medium, consisting only of reaction productions without the necessity of adding any further solvents. The recovery of the products is thus considerably simplified.

I claim:

1. A process for the production of caprolactam which comprises heating together 1,1'-peroxydicyclohexylamine and a lithium halide in a molten caprolactam environment.

2. A process according to claim 1 wherein the lithium halide is lithium chloride.

3. A process according to claim 1 wherein the lithium halide is lithium bromide.

4. A process according to claim 1 wherein the lithium halide is fed in the form of a solution in molten caprolactam to a reactor in which 1,1'-peroxydicyclohexylamine and lithium halide are heated together.

5. A process according to claim 4 wherein recycled caprolactam is fed to the reactor.

6. A process according to claim 5 wherein the recycled caprolactam is crude caprolactam containing high boilers.

7. A process according to claim 1 wherein the 1,1'-peroxydicyclohexylamine is fed to the reaction in the form of an oil containing cyclohexanone.

8. A process according to claim 1 wherein the reaction is carried out batchwise by adding caprolactam lithium halide and 1,1'-peroxydicyclohexylamine to a reactor in which the caprolactam is maintained in the molten state.

9. A process according to claim 1 wherein a caprolactam stream is fed to one or more reactors to which 1,1'-peroxydicyclohexylamine and lithium halide are also fed.

10. A process according to claim 1 wherein the 1,1'-peroxydicyclohexylamine and lithium halide are heated together at temperatures in the range 60° C. to 170° C.

11. The process according to claim 10 wherein the temperature is in the range 100° C. to 140° C.

12. A process according to claim 1 wherein the molar ratio of lithium halide to 1,1'-peroxydicyclohexylamine fed to the reaction is in the range 0.1:1 to 5:1.

13. A process according to claim 12 wherein the molar ratio of lithium halide to 1,1'-peroxydicyclohexylamine is greater than 0.3:1.

14. A process according to claim 9 wherein the molar ratio of caprolactam fed to the reaction to 1,1'-peroxydicyclohexylamine fed to the reaction is not more than 8:1.

15. A process according to claim 14 wherein the molar ratio of caprolactam fed to 1,1'-peroxydicyclohexylamine fed is 0.5:1 to 5:1.

16. A process according to claim 1 wherein the concentration of lithium halide in the reaction mixture is greater than 0.01 mole per litre.

17. A process according to claim 16 wherein the concentration is greater than 0.5 mole per litre.

References Cited

UNITED STATES PATENTS 3,350,393  10/1967  Petri et al. _____ 260—239.3

FOREIGN PATENTS 1,537,517  7/1968  France.

OTHER REFERENCES

Derwento Patent Service abstracting Belgian Pat. No. 704,214, filed Sept. 22, 1967, issued Mar. 22, 1968.

HENRY R. JILES, Primary Examiner

R. T. BOND, Assistant Examiner